Jan. 29, 1946.  R. B. FULLER  2,393,676
CARTOGRAPHY
Filed Feb. 25, 1944  5 Sheets-Sheet 1

INVENTOR
RICHARD BUCKMINSTER FULLER
BY
Donald W. Robertson

Jan. 29, 1946.  R. B. FULLER  2,393,676
CARTOGRAPHY
Filed Feb. 25, 1944  5 Sheets-Sheet 2

INVENTOR
RICHARD BUCKMINSTER FULLER
BY
Donald W. Robertson
ATTORNEY

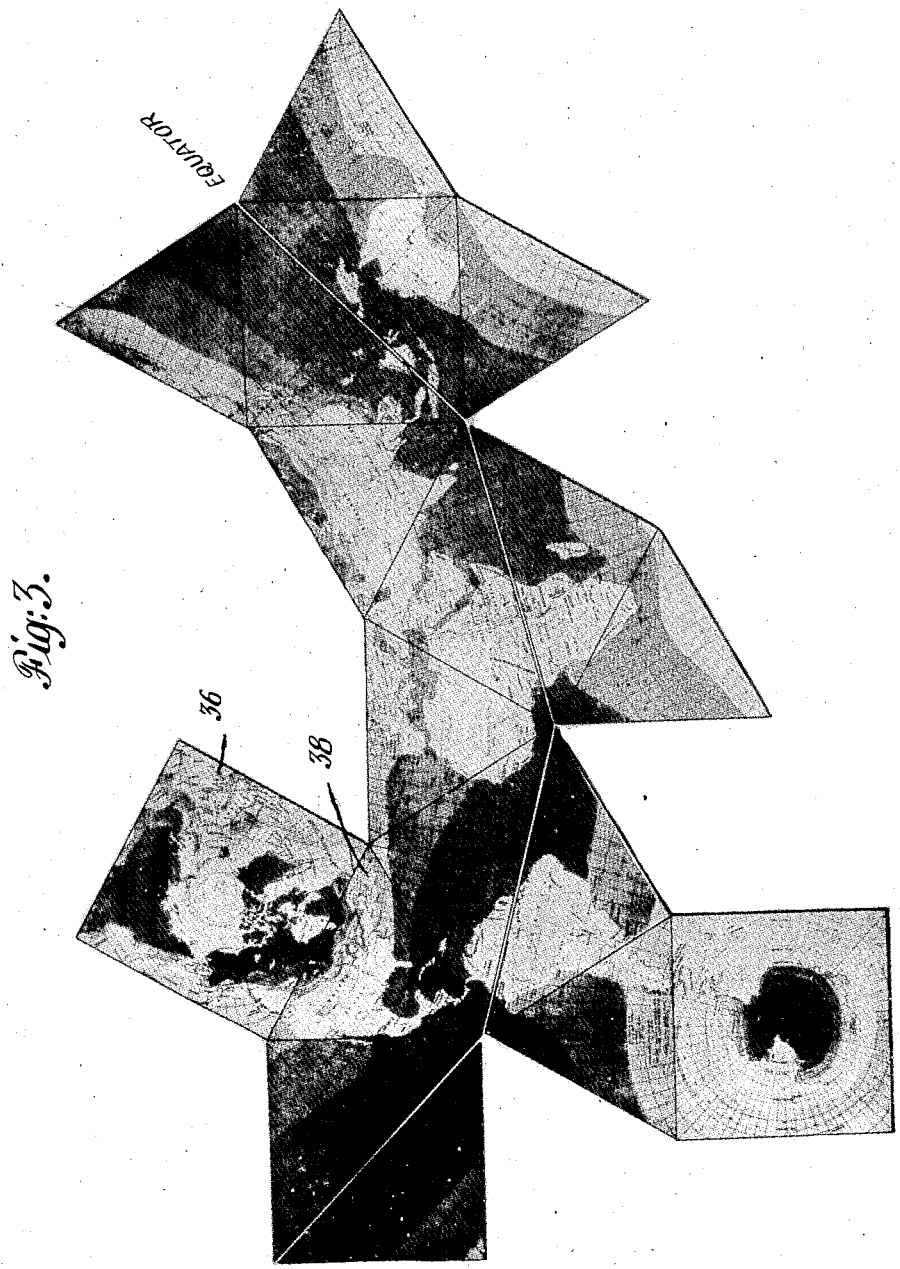

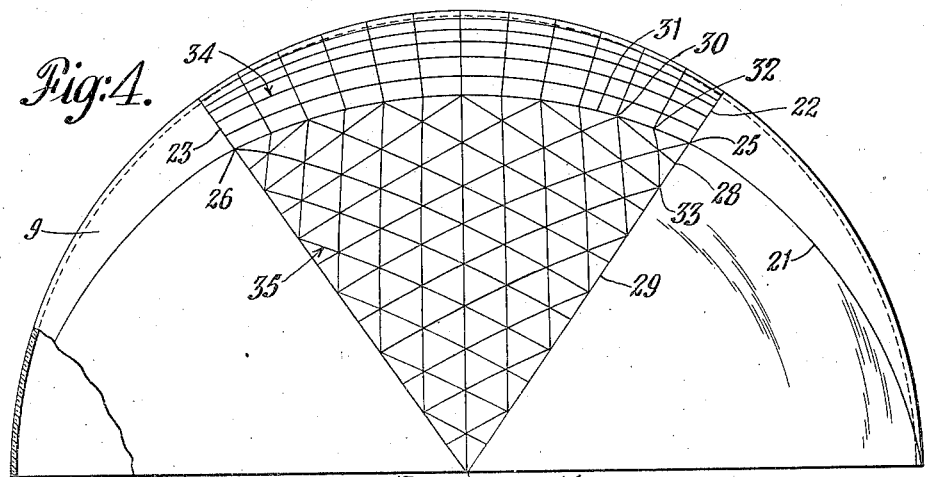
*Fig: 4.*
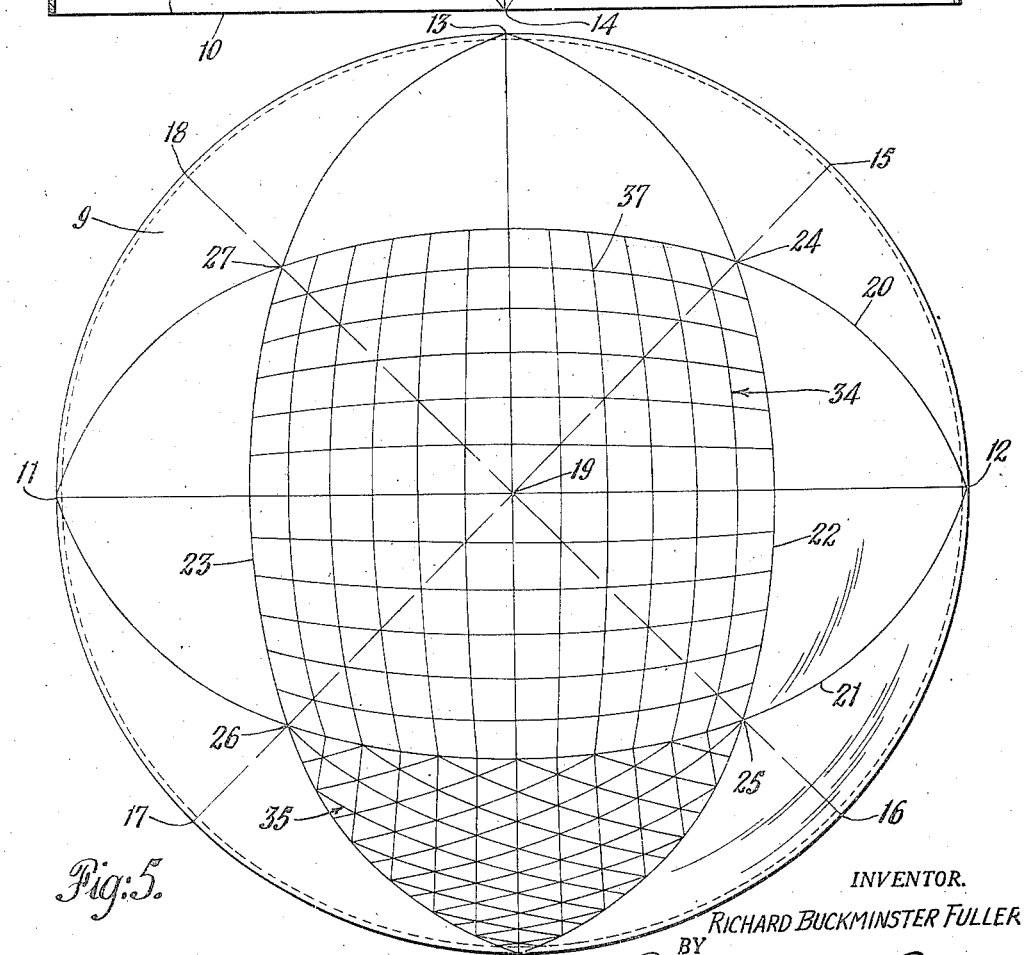
*Fig: 5.*
INVENTOR.
RICHARD BUCKMINSTER FULLER
BY
Donald W. Robertson Jan. 29, 1946.   R. B. FULLER   2,393,676
CARTOGRAPHY
Filed Feb. 25, 1944   5 Sheets-Sheet 5
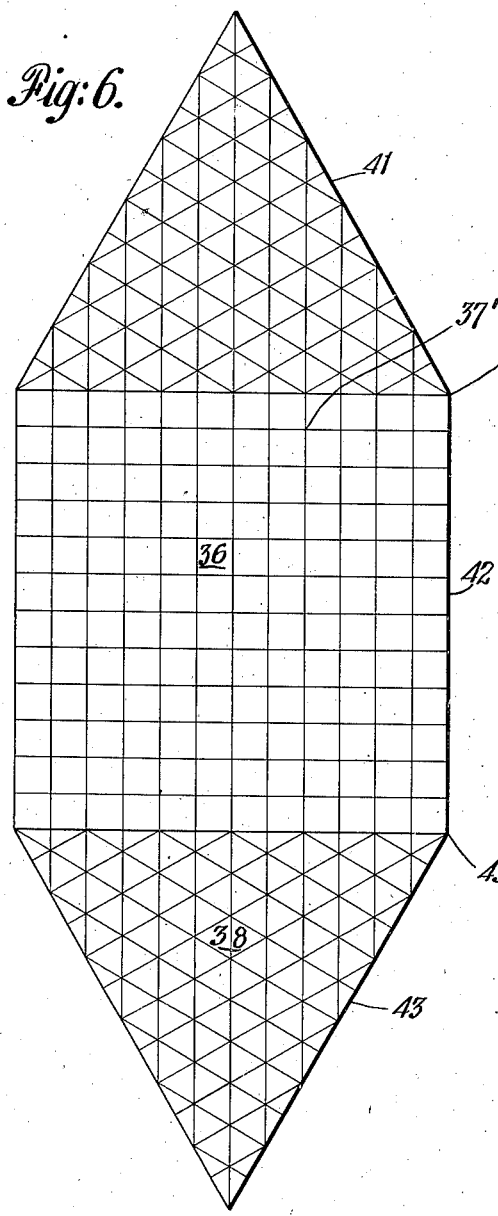
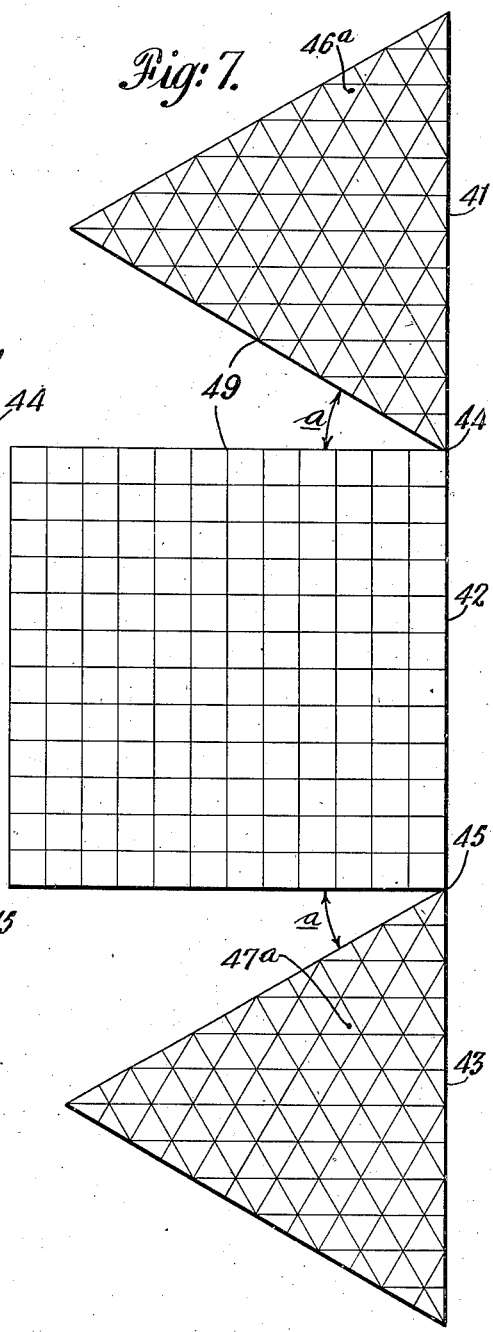
INVENTOR.
RICHARD BUCKMINSTER FULLER
BY
Donald W. Robertson Patented Jan. 29, 1946

2,393,676

UNITED STATES PATENT OFFICE 2,393,676

CARTOGRAPHY

Richard Buckminster Fuller, Washington, D. C.

Application February 25, 1944, Serial No. 523,842

3 Claims. (Cl. 35—46)

The invention relates to cartography.

As the earth is a spherical body, so the only true cartographic representation of its surface must be spherical. All flat surface maps are compromises with truth. For example, Mercator's projection is true to scale only along the equator, and azimuthal projection is limited to convergence of the meridians at one pole at a time. Other known systems of projection can be made to give uniform scale along parallels, or to give equal areas albeit with exaggerated shape distortions.

Another expedient has been to resolve the earth's surface into a polyhedron, projecting gnomonically to the facets of the polyhedron, the idea being that the sections of the polyhedron can be assembled on a flat surface to give a truer picture of the earth's surface and of directions and distances. Such a system is fettered to the limitations and gross radial distortions which characterize gnomonic projection.

It is an object of my invention to provide a sectional map of the world, or of a portion of its surface, which is so constructed that its parts can be assembled to give a truer over-all picture of areas, boundaries, directions and distances than is attainable with any type of plane surface map heretofore known.

Another object has been to provide a subdivision of the earth's surface for cartographic purposes which will result in sections that can be assembled with fewer sinuses in land areas than is possible with sectional maps heretofore known.

Other objects and advantages will appear as the description proceeds.

I have found that by resolving the earth's surface into sections which are entirely bounded by straight line projections of great circles, and constructing a map on great circle grids, it is possible to maintain uniform scale peripheral cartographic delineations and to distribute all subsidence distortion from the periphery toward the center. I have discovered further that this system brings the subsidence distortion to an irreducible minimum which, without correction of any kind, is very considerably less than with any system of projection heretofore devised.

Another discovery which I have made is that if the earth's surface is resolved into six equilateral square sections and eight equilateral triangular sections whose edges match throughout, there is formed a polyhedron all of the vertexes of which lie in great circles of a sphere. This figure I call a "dymaxion." As a consequence, all of the sides of all of the sections are true projections of great circles, and uniform scale peripheral cartographic delineations can be constructed.

With reference to the accompanying drawings, I shall now describe a preferred form of my improved map and the method of constructing it.

Figure 1:
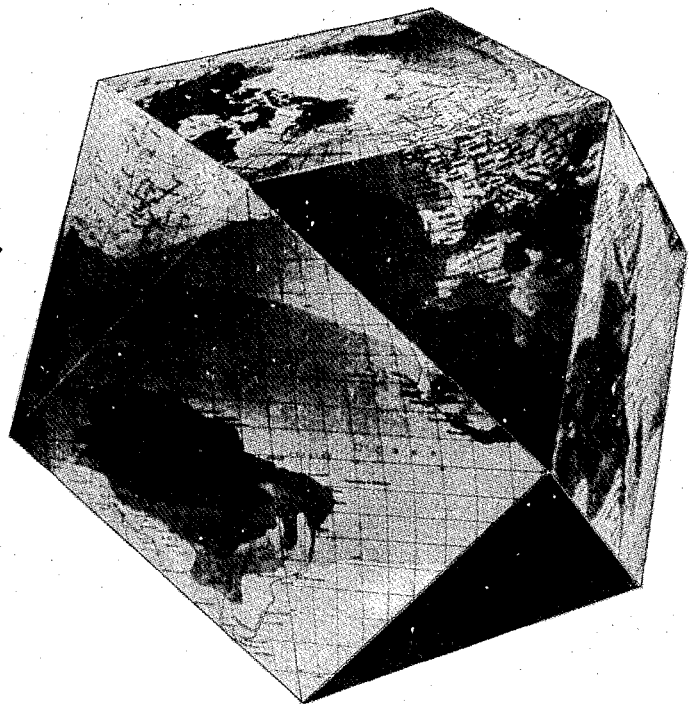
Fig. 1 is a perspective view of a "dymaxion," in which the earth's surface is resolved into that form of polyhedron which has six equilateral square sections and eight equilateral triangular sections whose edges match throughout and all of the vertexes of which lie in great circles of a sphere.
Figure 2:
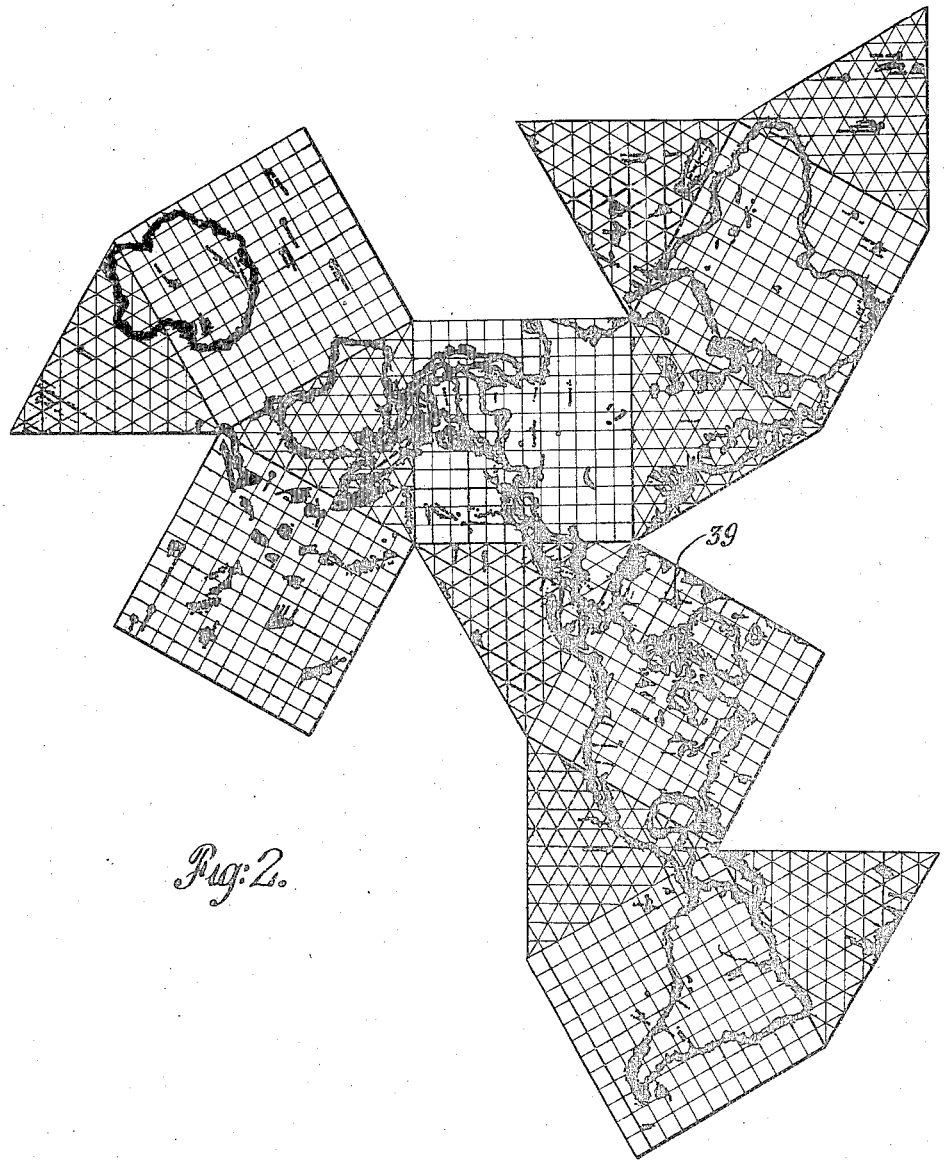
Fig. 2 is a map of the world made up of a plurality of square and triangular sections, the cartographic delineations being constructed on great circle grids. In this embodiment of the invention the location of the pole and the orientation of the map relative to the "dymaxion" are such that the land areas can be joined without land sinuses.

Fig. 3 is a view similar to Fig. 2, and shows an arrangement of the sections of the polyhedron of Fig. 1. In this embodiment of the invention the poles are located arbitrarily at the centers of two of the square sections or facets of the polyhedron. The sections are laid in a pattern that approximates the familiar appearance of the Mercator projection. The equator is a continuous line, orienting the world east to west.

Fig. 4 is an elevational view of a cartographic device having a spherical grid composed of intersecting great circles. This is the form of device which I prefer to use in transfering cartographic delineations from a spherical to a plane surface.

Fig. 5 is a plan view of the cartographic device of Fig. 4.

Figs. 6 and 7 depict two arrangements of selected map sections illustrating the relationship of sinus to arc. The sections shown have the great circle grids which I will describe, but for the sake of simplicity the cartographic delineations have been omitted in these views.

Figure 8:
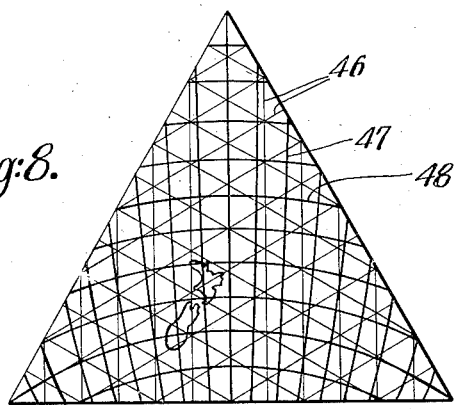

Fig. 8 is a detail view of one of the triangular sections showing a three-way great circle grid and, superimposed, meridians and parallels.

An essential feature of my invention resides in constructing the map on great circle grids. In the case of the square section, a two-way grid is employed. In the case of the triangular sections, a three-way great circle grid is employed. This will be understood in part from Figs. 4 and 5 which show one form of cartographic device used in constructing my polyhedral map from a globe.

Construction of the cartographic device

The invention, and its distinguishing attributes and advantages, may best be understood by considering first my preferred method of translating true spherical cartographic delineations to the flat sections which are the facets of the particular form of polyhedron shown in Fig. 1 heretofore referred to as the "dymaxion." Let us assume that we start with a standard globe. First, we construct a member in the form of a hemisphere 9, illustrated by Figs. 4 and 5. The size of this hemisphere is such that it will fit closely over the surface of the globe that has been selected—i. e., the inside diameter of the member 9 will be approximately equal to the diameter of the globe. The member 9 may conveniently be formed of a transparent plastic, although this is a matter of choice and other materials may be employed. Preferably, it is made as thin as will permit convenient handling so as to avoid undue parallax in reading the great circle coordinates off the globe.

We have seen that all of the vertexes of the polyhedron represented in Fig. 1 lie on great circles of a sphere. The first step in laying out the great circle grids on the member 9 is to locate these vertex points for at least one triangular section and for at least one rectangular section. In other words, we are going to construct on the member 9 a spherical triangle and a spherical rectangle the vertexes of which coincide with selected vertexes of a polyhedron which has six equilateral square facets and eight equilateral triangular facets. The locating of the vertexes on the member 9 may be accomplished by any desired means and it is not essential that the grids formed on the member 9 be disposed in the exact positions shown in Figs. 4 and 5 relative to the edge 10 of this member. However, it is convenient to have the spherical rectangle centered on the member, as shown in Fig. 5.

One method of locating the vertexes on the member 9 is as follows: locate the points 11 and 12 (Fig. 5) along the edge 10 of the member 9 at diametrically opposite positions. Locate the points 13 and 14 along the edge 10 midway between the points 11 and 12. Locate the points 15, 16, 17 and 18 along the edge 10 midway between the points 12—13, 12—14, 11—14, and 11—13, respectively. What this amounts to is dividing the great circle edge 10 of the member 9 into eight parts. Scribe four great circle arcs (spherical straight lines) between the points 13—14, 15—17, 11—12, and 16—18. These great circle arcs can conveniently be drawn by placing the member 9 on the globe with the diametrically opposite points on one of the great circles of the globe with the center point 19 at the pole or somewhere along the same great circle, and then tracing the great circle onto the surface of the member 9. The points 24, 25, 26 and 27 are located midway between the point 19 and the points 15, 16, 17 and 18 respectively, i. e., 45° from the point 19. The great circle arcs 20, 21, 22 and 23 are then constructed so as to intersect at points 24, 25, 26, and 27. This divides each of the great circle arcs 20, 21, 22 and 23 into three equal parts of 60°. We now have a spherical rectangle 24—25—26—27 whose vertexes coincide with the vertexes of any one of the six equilateral square facets of Fig. 1, and a spherical triangle 14—25—26 whose vertexes coincide with the vertexes of any one of the eight equilateral triangular facets of Fig. 1.

Each side of the spherical rectangle is now divided into any desired number of equal parts. In the embodiment shown the division is into twelve parts, each of which is 5° of arc. By joining all of these points with great circle arcs, we obtain the grid shown in Fig. 5 consisting of great circle arcs. These can conveniently be drawn by placing the member 9 on the globe and locating each pair of corresponding points along any great circle, then tracing the great circle onto the member 9.

To construct the three-way grid on the spherical triangle, the sides of the triangle are similarly divided into any desired number of parts (twelve, as shown) and the great circle arcs are scribed as shown in Fig. 4, connecting the first division point 28 of the side 29 to the second division point 30 of the side 31 (and so on), and connecting the first point 32 of the side 31 with the second point 33 of the side 29, and so on. In each case, the great circle arcs can be drawn by tracing from a globe as previously described.

We now have on the member 9 a two-way great circle grid indicated generally at 34 (Fig. 5) and a three-way great circle grid indicated generally at 35 (Fig. 4). A peculiarity of a three-way great circle grid constructed on an equilateral spherical triangle whose vertexes correspond to the polyhedron shown in Fig. 1 (consisting of six equilateral rectangular facets and eight equilateral triangular facets) is that all of the great circle arcs intersect—that is, the entire pattern of the grid shows intersections of three great circle arcs.

It will be understood, of course, that the provision of both the rectangular and triangular grids on the one cartographic device 9 is largely a matter of convenience, and I contemplate that if desired, the triangular grid could be placed upon a separate device apart from the rectangular grid; also, that they could be located in different positions on the hemispherical member 9. Furthermore, it is not necessary that the rectangular and triangular grids be conjoined in the manner shown in Figs. 4 and 5 as they are susceptible of use entirely independently of one another.

*Translation from the spherical to the plane surface*

The flat sections or tiles shown in Figs. 2, 6 and 7 are the facets of the polyhedron, and the corners or vertexes of each tile are the vertexes of the polyhedron. Each tile is provided with a great circle grid, those on the square tiles corresponding to the spherical grid 34 and those on the triangular tiles corresponding to the grid 35 previously described. The grids are constructed as before by dividing the sides into the desired number of equal parts. Assuming 5° intervals, we will divide into twelve parts to gain correspondence with the spherical grids. In this case, the points along the edges of the tiles are joined by straight lines. These straight lines are true representations of a projection of a great circle since the projection of a great circle is a straight line. All of the edges of each tile are projections of great circles.

Having the device of Figs. 4 and 5 and the tiles with their great circle grids as shown in Figs. 6 and 7, we now proceed to translate cartographic delineations from the spherical to the plane surface. For example, let us suppose that we are mapping on one of the square tiles. We will place the member 9 on the globe with the spherical grid 34 overlying that portion of the earth's surface which is to be translated to the tile (Fig. 6). If it is desired to have the poles at the centers of the square tiles as in the case of the map represented by Fig. 3, the spherical grid 34 will be centered on one of the poles and oriented as shown (or otherwise, as may be desired). The coordinates of the particular city, coast-line point, or other cartographic feature are read on the grid 34 and plotted on the grid of the tile 36. Thus, if the particular point being plotted lies at the point 37 on the grid 34, it will be plotted at the point 37' on the grid of the tile 36. This process is repeated for each point that is being translated from the spherical to the plane surface. It will, of course, be understood that the grids may be subdivided as finely as may be desired. That is, the grid may be carried down to 1° intervals or to fractions of a degree, depending upon the accuracy desired.

The same procedure is followed in translating from the globe to the triangular tile 38. First, the member 9 is so located on the globe that the corners 25 and 26 of the triangular grid 35 overlie the desired points, that is, they will overlie the same points as did the corners 25 and 26 of the rectangular grid 34 during use of the latter. Coordinates are read on the grid 35 and plotted on the grid of the tile 38.

It is not necessary that the poles be located at the centers of square tiles, and in Fig. 2 I have illustrated a modification in which the north pole is located in an arbitrary position 39 which was selected with view to having the land areas so placed as to eliminate land sinuses. It will be observed that in this embodiment, the land areas have been joined without sinuses.

The embodiment illustrated in Fig. 3 is useful because of its approximation of the Mercator projection which brings the character of the Renaissance world into bold relief.

A distinguishing feature of the maps of both Figs. 2 and 3, and of other maps which can be constructed in accordance with my invention, is that each plane section or tile has uniform scale peripheral cartographic delineation. This is possible because the sections match along edges which are representations of projected great circles. This means that distances measured along the edges of any section are true to scale, and that scale is uniform throughout. Moreover, by reason of employment of the particular method of translating from the spherical to the plane surface which I described, subsidence errors are distributed interiorly of the periphery. This is accomplished by plotting on the great circle grid and no corrections are required. The tiles may be arranged in any manner which may be desired for the study of particular land or water features, directions and distances. With three tiles arranged as shown in Fig. 6, we have along the edges 41, 42, 43 the arc of a great circle which may extend from pole to pole, or which may extend from any point on the earth to any point on the opposite side of the earth. If we shift the upper and lower triangular tiles into the position shown in Fig. 7 by simply turning them through an angle of 30° about the points 44 and 45, respectively, we see at a glance the straight line distances and directions between any two points along the line 41, 42, 43.

With reference to Fig. 7, it will be observed that points 44 and 45 are 30° removed in arc from the center axis 49 of the sections, and that the triangular tiles have been opened away from the square section by a corresponding 30° sinus angle a.

Fig. 8 shows one of the triangular tiles in which the three-way great circle grid is shown in light lines at 46, and superimposed thereon are the meridians 47 and parallels 48 which may be plotted on the tile in the same manner as the other cartographic delineations are plotted. If desired, the map may be employed without adding the superimposed meridians and parallels. Where the meridians and parallels are used, the great circle grid may, if desired, be removed either before or after the map has been plotted. In this case the great circle grid will have been used purely as a construction device.

When the great circle grid is employed merely as a construction device for translating meridians and parallels to a plane surface, it may be desirable to plot these down to single degrees, or even to fractions of a degree. The map itself may then be plotted directly on the coordinates of latitude and longitude, with the result of reducing the map to imaginary great circle grids, and producing a map which possesses the various advantages I have described. This system makes it possible to construct my novel map with the use of available cartographic data based on the system of latitudes and longitudes.

Among the advantages of my invention may be cited the provision of uniform scale along the periphery of all of the sections, the provision of a sectional map which can be assembled in a manner which eliminates land sinuses, and the fact that by having uniform peripheral scale with subsidence errors distributed interiorly of the periphery by plotting on a great circle grid, distortion is less than with any form of projection heretofore known. With gnomonic projection, the scale is true only at the exact center of a section, and subsidence errors build up in a radially outward direction at an alarming rate. Some systems of cartography resort to correction of areas on what is known as the "equal area" basis, which only serves to enormously distort shapes. Careful study of maps constructed in accordance with my invention will show that it gives a truer overall picture of areas, boundaries, directions and distances than is attainable with any type of plane surface map heretofore known.

The terms and expressions which I have employed are used in a descriptive and not a limiting sense, and I have no intention of excluding such equivalents of the invention described, or of portions thereof, as fall within the purview of the claims.

I claim:

1. A projected map comprising a plurality of square and triangular sections bearing respectively different map outlines and matching along edges which are representations of projected great circles with uniform scale cartographic delineation along said edges.

2. A map comprising two or more sets of different matching map sections, at least one section of each set being a square and one or more of the others an equilateral triangle, the map on the square sections being constructed on a two-way great circle grid and the map on the triangular sections being constructed on a three-way great circle grid.

3. A map of the world comprising six equilateral square sections and eight equilateral triangular sections matching along edges which are representations of projected great circles with uniform scale cartographic delineations along said edges.

RICHARD BUCKMINSTER FULLER.